US012380786B2

(12) United States Patent
Adams

(10) Patent No.: US 12,380,786 B2
(45) **Date of Patent: *Aug. 5, 2025**

(54) SENSOR ALIGNMENT INDICATOR FOR PREMISES DEVICES OF A PREMISES MONITORING SYSTEM

(71) Applicant: The ADT Security Corporation, Boca Raton, FL (US)

(72) Inventor: Benjamin Amos Adams, Bristol, VA (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/536,827

(22) Filed: Dec. 12, 2023

(65) Prior Publication Data

US 2024/0428668 A1 Dec. 26, 2024

Related U.S. Application Data

(63) Continuation of application No. 18/339,438, filed on Jun. 22, 2023, now Pat. No. 11,881,092.

(51) Int. Cl.
*G08B 13/24* (2006.01)

(52) U.S. Cl.
CPC ................................ *G08B 13/2491* (2013.01)

(58) Field of Classification Search
CPC ........ G08B 13/2491; G08B 13/08; E06B 5/11
See application file for complete search history.

(56) References Cited

U.S. PATENT DOCUMENTS 3,684,846 A * 8/1972 McDaniels ............ G08B 13/08 200/61.93
4,296,410 A 10/1981 Higgs et al.
5,434,556 A * 7/1995 Donohoo ............. G08B 21/086 340/636.15
5,912,619 A * 6/1999 Vogt ................... G08B 13/1481 340/541
5,936,522 A * 8/1999 Vogt ....................... G08B 13/08 340/556
6,060,969 A * 5/2000 Hufgard ................. H03K 17/97 324/207.21

(Continued)

*Primary Examiner* — Curtis J King
(74) *Attorney, Agent, or Firm* — Weisberg I.P. Law, P.A.

(57) ABSTRACT

According to some embodiments, a premise device for monitoring in a premises monitoring system is provided. The premises device comprises at least one switching element that is switchable between a first position and second position, an electromechanical switch that is triggerable to a closed position by a magnetic field, an alignment indicator configured to indicate the electromechanical switch is aligned for monitoring, a sensor, and a power element. In response to the at least one switching element being in the first position, the at least one switching element is configured to: electrically connect the alignment indicator and power element to the electromechanical switch, electrically disconnect the sensor from the electromechanical switch; and in response to the electromechanical switch being triggered to the closed position by the magnetic field, the alignment indicator is configured to emit visual, audio and/or haptic feedback based on alignment of the electromechanical switch for monitoring.

20 Claims, 5 Drawing Sheets

(56) References Cited

U.S. PATENT DOCUMENTS

| | | | | |
|---|---|---|---|---|
| 6,827,363 | B1 * | 12/2004 | Amerson | B60D 1/36 280/477 |
| 7,491,926 | B1 * | 2/2009 | Anderson | G08B 13/08 250/221 |
| 8,982,360 | B2 * | 3/2015 | Zhao | G08B 13/186 356/614 |
| 9,589,446 | B1 * | 3/2017 | Dey | G08B 25/008 |
| 9,898,923 | B1 * | 2/2018 | Petrucci | G08B 29/14 |
| 10,249,161 | B2 | 4/2019 | Carlson | |
| 10,755,554 | B2 * | 8/2020 | Nichols, Sr. | G08B 29/20 |
| 10,896,595 | B2 | 1/2021 | Lamb et al. | |
| 11,293,782 | B2 * | 4/2022 | Amir | G08B 13/08 |
| 11,473,337 | B2 | 10/2022 | Laporta | |
| 2005/0024207 | A1 | 2/2005 | Schebel et al. | |
| 2007/0069894 | A1 * | 3/2007 | Lee | E05B 45/06 340/542 |
| 2008/0224803 | A1 * | 9/2008 | Nakayama | H03K 17/9515 335/78 |
| 2009/0015405 | A1 * | 1/2009 | DiPoala | G08B 13/186 340/556 |
| 2009/0026355 | A1 * | 1/2009 | Anderson | G08B 13/08 250/221 |
| 2009/0027198 | A1 * | 1/2009 | DiPoala | G08B 13/08 340/545.2 |
| 2009/0027199 | A1 * | 1/2009 | DiPoala | G08B 13/08 340/547 |
| 2012/0139206 | A1 * | 6/2012 | May | B60R 3/02 280/166 |
| 2012/0167646 | A1 * | 7/2012 | Sharma | G01N 21/25 356/399 |
| 2015/0348385 | A1 * | 12/2015 | Lamb | G08B 29/20 340/547 |
| 2016/0187118 | A1 * | 6/2016 | Modi | G08B 5/36 340/815.45 |
| 2016/0247370 | A1 * | 8/2016 | Lamb | G08B 25/008 |
| 2016/0298950 | A1 * | 10/2016 | Modi | G01B 7/14 |
| 2017/0098356 | A1 * | 4/2017 | Dai | G01R 33/02 |
| 2017/0169675 | A1 * | 6/2017 | Burgess | G08B 13/08 |
| 2017/0343379 | A1 * | 11/2017 | Amir | G08B 13/184 |
| 2018/0059212 | A1 * | 3/2018 | Avitan | G01S 5/163 |
| 2018/0102044 | A1 * | 4/2018 | Lamb | G08B 29/04 |
| 2018/0233005 | A1 * | 8/2018 | Day | G08B 13/08 |
| 2018/0365943 | A1 * | 12/2018 | DiPoala | G08B 29/046 |
| 2019/0024412 | A1 * | 1/2019 | Lammers | E05B 15/0205 |
| 2019/0096203 | A1 * | 3/2019 | Seelman | G08B 29/22 |
| 2019/0180605 | A1 * | 6/2019 | Lamb | G08B 3/10 |
| 2021/0383662 | A1 * | 12/2021 | Gruber | G01D 5/24 |
| 2021/0407280 | A1 * | 12/2021 | Hoofe, IV | G08B 25/016 |
| 2022/0189271 | A1 * | 6/2022 | Carlson | G01R 33/02 |
| 2022/0263297 | A1 * | 8/2022 | Bodurka | E05D 11/0081 |
| 2022/0375319 | A1 * | 11/2022 | Kornegay | G08B 13/08 |
| 2023/0177933 | A1 * | 6/2023 | Gruber | G08B 13/08 340/545.4 |

* cited by examiner

SENSOR ALIGNMENT INDICATOR FOR PREMISES DEVICES OF A PREMISES MONITORING SYSTEM

CROSS-REFERENCE TO RELATED PATENT APPLICATION

This application is a continuation of and claims priority to U.S. Utility patent application Ser. No. 18/339,438, filed on Jun. 22, 2023, entitled SENSOR ALIGNMENT INDICATOR FOR PREMISES DEVICES OF A PREMISES MONITORING SYSTEM, the entirety of which is incorporated herein by reference.

TECHNICAL FIELD

The present disclosure is generally related to premises security and to methods and systems for a sensor alignment indicator for premises devices of a premises monitoring system.

BACKGROUND

Premises monitoring systems may include multiple devices of various types, including sensors, detectors, video cameras, etc., that are used for monitoring a premises. The data generated by these various types of devices may be communicated to a system control device to initiate an event alarm based on the data.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve the electrical and data communication.

In some embodiments described herein, the term "coupled," "connected," and the like, may be used herein to indicate a connection, although not necessarily directly, and may include wired and/or wireless connections.

Figure 1:
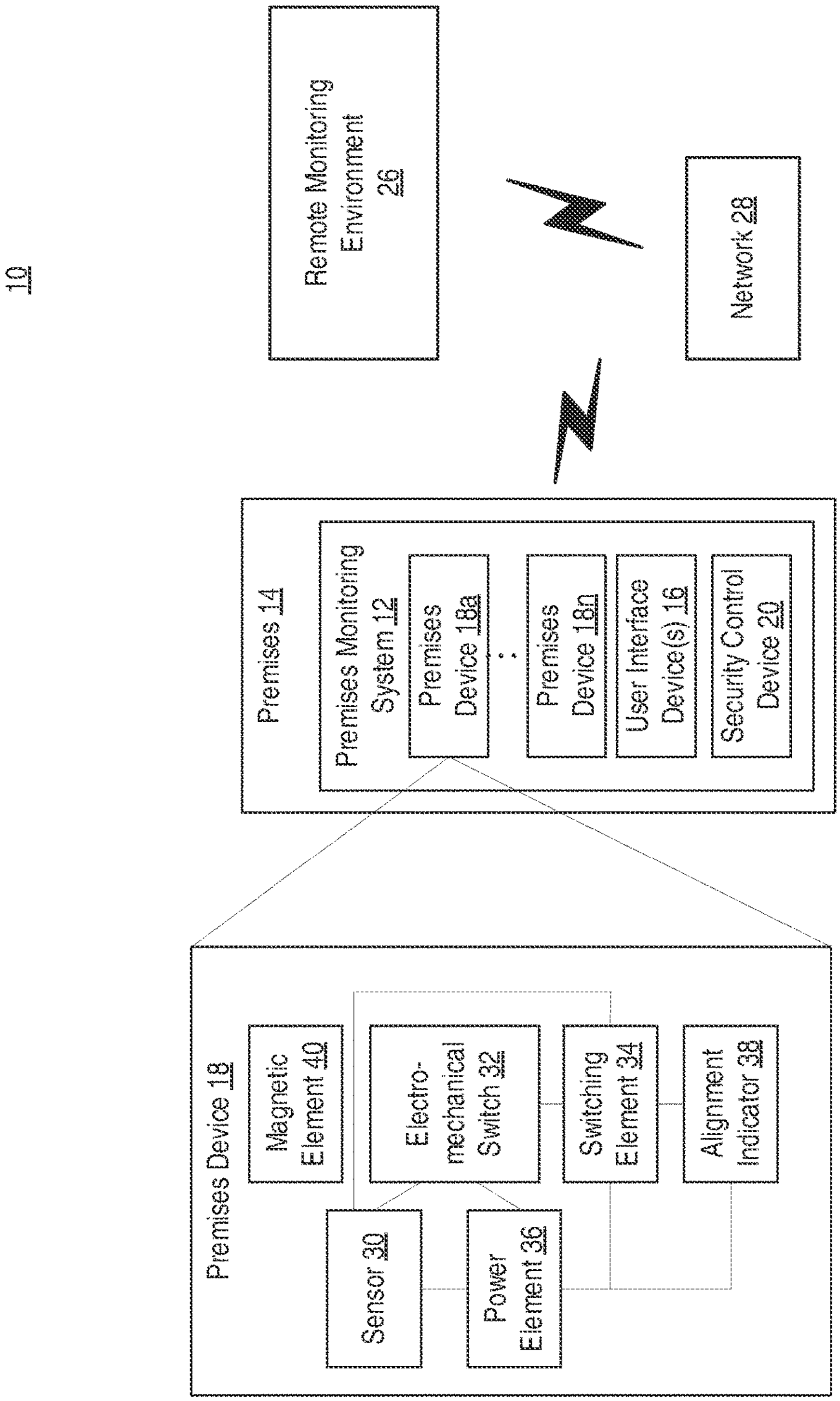
FIG. 1 is a diagram of an example system comprising a premises monitoring system according to some embodiments of the present disclosure.

Referring now to the drawing figures in which like reference designators refer to like elements there is shown in FIG. 1 a system designated generally as "10." System 10 may include premises monitoring system 12 for monitoring premises 14. Premises monitoring system 12 in which premises monitoring system 12 includes and/or is associated with one or more user interface devices 16, one or more premises devices 18*a* to 18*n* (collectively referred to as "premises device 18"), and security control device 20. Security control device 20 may be configured for controlling and/or managing the premises monitoring system 12. Security control device 20 may be in communication with remote monitoring environment 26 via one or more networks 28. According to various embodiments, the premises monitoring system 12 may be, for example, a premises security system and/or a premises automation system.

User interface device 16 may be a wireless device that allows a user to communicate with security control device 20. User interface device 16 may be a portable control keypad/interface, computer, mobile phone or tablet, among other devices that allow a user to interface with security control device 20 and/or one or more premises devices 18. User interface device 16 may communicate at least with security control device 20 using one or more wired and/or wireless communication protocols. For example, portable control keypad may communicate with security control device 20 via a ZigBee based communication link, e.g., network based on Institute of Electrical and Electronics Engineers (IEEE) 802.15.4 protocols, and/or Z-wave based communication link, or over the premises' local area network, e.g., network-based on IEEE 802.11 protocols. In one or more embodiments, user interface device 16 and security control device 20 may be integrated into a single device.

Premises device 18 may include sensors, management apparatuses, image capture devices, audio capture devices, life safety devices, premises automation devices, and/or other devices. For example, the types of sensors may include various life safety-related sensors, such as motion sensors, fire sensors, carbon monoxide sensors, flooding sensors and contact sensors, among other sensor types. A management apparatus may include, for example, a device configured to adjust at least one premises setting, such as lighting, temperature, energy usage, door lock and power settings, among other settings associated with the premises or devices on the premises. Image capture devices may include digital cameras and/or video cameras, among other image capture devices. Premises device 18 may be configured for sensing one or more aspects of the environment, such as an open or closed door, open or closed window, motion, heat, smoke, gas, sounds, images, people, animals, objects, etc.

In one or more embodiments, premises device 18 may include sensor 30 that is configured to sense whether electromechanical switch 32 is open or closed. Premises device 18 may include one or more switching elements 34 that are in electrical communication with sensor 30, electromechanical switch 32, power element 36, and alignment indicator 38. In one or more embodiments, electromechanical switch 32 is a reed switch or other switch that is able to open or close when exposed to and/or aligned with a magnetic field. Switching element 34 is configured to electrically connect one or more elements and/or components to electromechanical switch 32 based on whether switching element 34 is in a first position or second position, as described herein. In one or more embodiments, switching element 34 is a wirelessly controllable switching element 34 that is configured to receive one or more commands to cause and/or trigger the wirelessly controllable switching element 34 to switch to a first or second position. In one example, remote monitoring environment 26 and/or security control device 20 may transmit one or more commands to cause wirelessly controllable switching to switching to a first or second position.

Power element 36 is configured to power sensor 30 and, depending on the switch position of switching element 34 and on whether electromechanical switch 32 is open or closed, power alignment indicator, as described herein. Alignment indicator 38 may be configured to provide one or more of visual feedback, haptic feedback, audible feedback, etc., depending on the switch position of switching element 34 and on whether electromechanical switch 32 is open or closed, as described herein. In one or more embodiments, alignment indicator 38 is a light emitting diode (LED) or other element that is configured to emit an optically perceivable indication. In other embodiments, alignment indicator 38 can be a buzzer, speaker, or other device that emits sound.

Premises device 18 may include a magnetic element 40 is configured to generate a magnetic field. For example, magnetic element 40 may comprise a magnet that is configured to cause electromechanical switch 32 to close when electromechanical switch 32 is within the magnetic field and/or proximate to magnetic element 40 and/or exposed to the magnetic field and/or aligned with the magnetic field. In one or more embodiments, premises device 18 may be a door sensor or window sensor such that magnetic element 40 may be positioned on a different part of the door or window than the remaining elements of premises device 18 (e.g., electromechanical switch 32, sensor 30, etc.). For example, magnetic element 40 may be positioned on the door while the remaining elements of premises device 18 (e.g., electromechanical switch 32, etc.) are positioned on the door frame or wall proximate to the door. The positioning of magnetic element 40 relative to electromechanical switch 32 may be facilitated by the use of alignment indicator 38 that is configured to provide an alignment indication that indicates whether magnetic element 40 is aligned (e.g., magnetically aligned) with electromechanical switch 32, as described herein.

Security control device 20 may provide one or more of management functions, monitoring functions, analysis functions, control functions such as power management, premises device management and alarm management and/or analysis, among other functions to premises monitoring system 12. In particular, security control device 20 may manage one or more life safety or premises automation features. Life safety features may correspond to monitoring system functions and settings associated with premises conditions that may result in life-threatening harm to a person, such as carbon monoxide detection and intrusion detection (e.g., video detection, sensor detection, etc.). Premises automation features may correspond to monitoring system functions and settings associated with video capturing devices and non-life-threatening conditions of the premises, such as lighting and thermostat functions. In one or more embodiments, security control device 20 may receive a sensor signal from sensor 30 indicating that sensor 30 has been triggered, which may cause security control device 20 to trigger a premises alarm. In one or more embodiments, security control device 20 may control switching element 34 via one or more wireless commands such that security control device 20 is able to cause switching element 34 to switch to a first position or second position based on whether the alignment function may be needed. For example, security control device 20 may trigger and/or enable the alignment feature of premises device 18 after enrolling premises device 18 into the premises monitoring system 12. Further, using the same example, security control device 20 is configured to disable the alignment feature of premises device 18 after a predefined time period or in response to detecting the feedback from alignment indicator 38. That is, security control device 20 may be configured to detect audio signals and/or visual signals via one or more other preemies devices 18 (e.g., video camera, microphone, etc.), thereby allowing security control device 20 to determine that magnetic element 40 is aligned with electromechanical switch 32.

Security control device 24 may communicate with network 28 via one or more communication links. In particular, the communications links may be broadband communication links, such as a wired cable modem or Ethernet communication link, and a digital cellular communication link, such as a long term evolution (LTE), 5G and/or 6G based link, among other broadband communication links. A broadband link in various embodiments may be a communication link other than a plain old telephone service (POTS) line. An Ethernet communication link may be an IEEE 802.3 or 802.11 based communication link. Network 28 may be a wide area network, local area network, wireless local network and metropolitan area network, among other networks. Network 28 provides communications among one or more of security control device 20, and/or remote monitoring environment 26.

System 10 may also include a remote monitoring environment 26 in communication with premises monitoring system 12 via network 28. Remote monitoring environment 26 may be configured to perform certain monitoring, configuration and/or control functions associated with system 10. For example, remote monitoring environment 26 may be configured to enable or disable the alignment function of premises device 18. For example, remote monitoring environment 26 may enable the alignment function of premises device 18 as part of a troubleshooting process when premises device 18 is not operating and/or monitoring properly. In one or more embodiments, remote monitoring environment 31 may perform various life safety response processes in notifying the owner of the premises, determining whether an actual alarm event is occurring at the premises, and notifying any appropriate response agency (e.g., police, fire, emergency response, other interested parties such as premises owners, etc.).

Example implementations, in accordance with embodiments of system 10 discussed in the preceding paragraphs will now be described with reference to FIG. 2. Sensor 30 of premises device 18 comprises hardware 44. The hardware 44 may include processing circuitry 46. The processing circuitry 46 may include a processor 48 and a memory 50. In particular, in addition to or instead of a processor, such as a central processing unit, and memory, the processing circuitry 46 may comprise integrated circuitry for processing and/or control, e.g., one or more processors and/or processor cores, field programmable gate arrays (FPGAs), and/or application specific integrated circuits (ASICs) adapted to execute instructions. The processor 48 may be configured to access (e.g., write to and/or read from) the memory 50, which may comprise any kind of volatile and/or nonvolatile memory, e.g., cache, buffer memory, random access memory (RAM), read-only memory (ROM), optical memory, and/or erasable programmable read-only memory (EPROM). Further, memory 50 may be configured as a storage device.

Hardware 44 may include communication interface 52 enabling sensor 30 to communicate with any component or device of system 10. For example, communication interface 52 may be configured for establishing and maintaining at least a wireless or wired connection with any component or device of system 10, such as with security control device 20. The communication interface 52 may be formed as or may include, for example, one or more radio frequency (RF) transmitters, one or more RF receivers, and/or one or more RF transceivers.

Sensor 30 further has software 54 (which may include one or more software applications) stored internally in, for example, memory 50, or stored in external memory (e.g., database, storage array, network storage device, etc.) accessible by the sensor 30 via an external connection. Software 54 may include any software or program configured to perform the steps or processes of the present disclosure.

The processing circuitry 46 may be configured to control any of methods and/or processes described herein and/or to cause such methods, and/or processes to be performed, e.g., by sensor 30. Processor 48 corresponds to one or more processors 48 for performing sensor 30 functions described herein. The memory 50 is configured to store data and/or files such as premises system data and/or other information/data. In some embodiments, the software 54 may include instructions that, when executed by the processor 48 and/or processing circuitry 46, causes the processor 48 and/or processing circuitry 46 to perform the processes described herein with respect to premises device 18.

Figure 2:
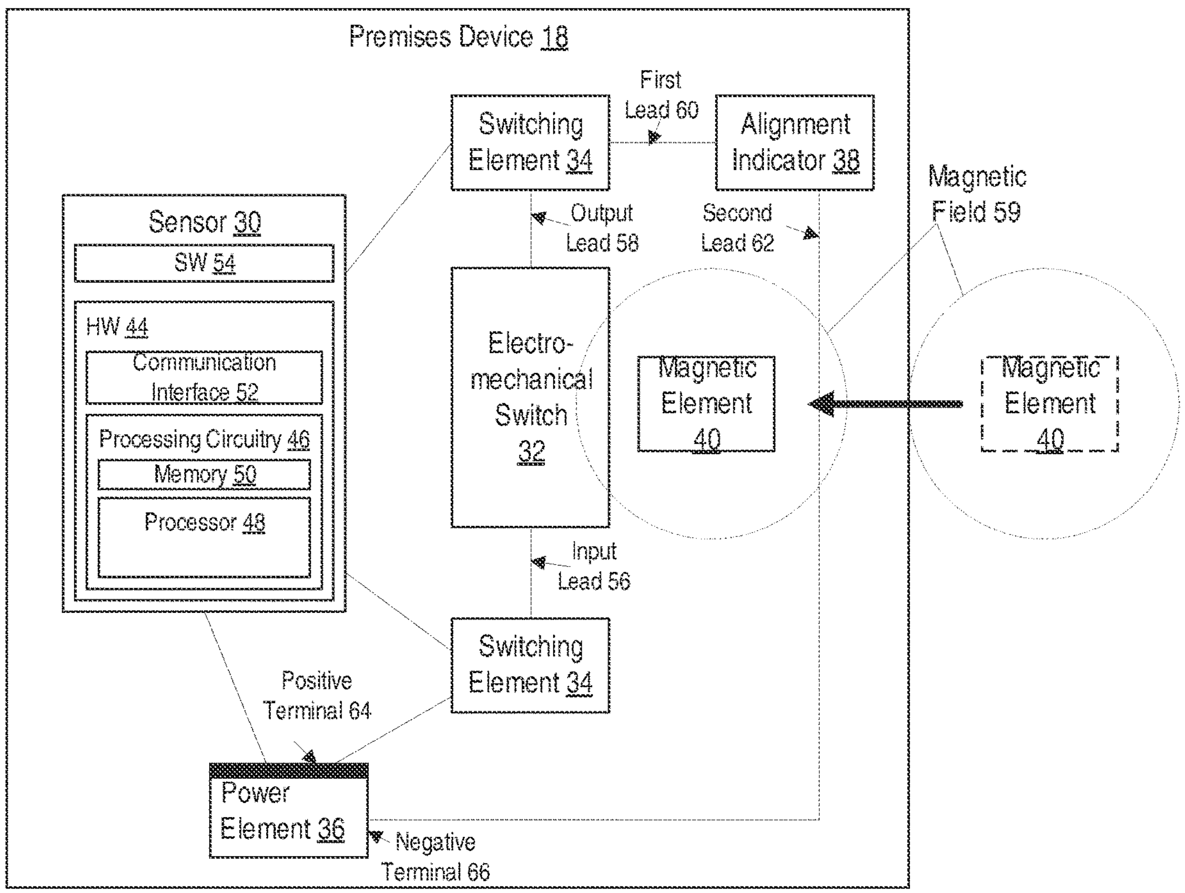
FIG. 2 is a block diagram of an example of a premises device in the system of FIG. 1 according to some embodiments of the present disclosure.

Continuing to refer to FIG. 2, electromechanical switch 32 comprises an input lead 56 and an output lead 58. In one or more embodiments, electromechanical switch 32 comprises a switching element 34 that is configured to close when within the range of a magnetic field 59. For example, when the electromechanical switch 32 is in the "close" position, input lead 56 is electrically connected to output lead 58. In one or more embodiments, the switching element 34 may be configured to open when not within the range of the magnetic field 59. For example, when the electromechanical switch 32 is in the "open" position, input lead 56 is not connected or disconnected from output lead 58.

In one or more embodiments, magnetic element 40 may comprise a magnet that comprises magnetic field 59. In one or more embodiments, magnetic element 40 may be positioned on a movable part of a premises element (e.g., door, window) that moves when the premises element is opened or closed such that, for example, magnetic field 59 of magnetic element 40 causes electromechanical switch 32 to close when the premises element is in a close position (i.e., the door or window is closed). Continuing the example, electromechanical switch 32 may open when the premises element is in an open position (i.e., the door or window is open).

Further, alignment indicator 38 has a first lead 60 and a second lead 62 that are connected to an indicator element (not shown) of alignment indicator 38. For example, first lead 60 and second lead 62 are in electrical communication with indicator element where indicator element may be a visual indicator element, haptic indicator element and/or audible indicator element. That is, alignment indicator 38 may be configured to generate visual, haptic and/or audible feedback when alignment indicator 38 power, voltage and/or current is provided to alignment indicator 38.

In one or more embodiments, power element 36 is a power source (e.g., battery) that has positive terminal 64 and negative terminal 66 for providing power, voltage and/or current to one or more elements of premises device 18. For example, the elements of premises device 18 that are configured to receive power from power element 36 may depend on the close and/or open position of electromechanical switch 32 and switching element 34, as described herein.

In one or more embodiments, switching element 34 may be a double pole switch or other mechanical switch that is configured to perform the switching functions described herein. In one or more embodiments, switching element 34 may be a wirelessly controllable switching element 34 that includes one or more hardware and/or software elements similar to sensor 30 such as to allow wirelessly controllable switching element 34 to receive commands and/or instructions to enter a close or open position to connect and/or disconnect sensor 30 or alignment indicator 38, as described herein. The commands and/or instructions received by wirelessly controllably switching element 34 may be generated by security control device 20, remote monitoring environment 26, user interface device 16, etc. such as during, for example, installation, troubleshooting or a security health check to verify the functionality of one or more components.

Figure 3:
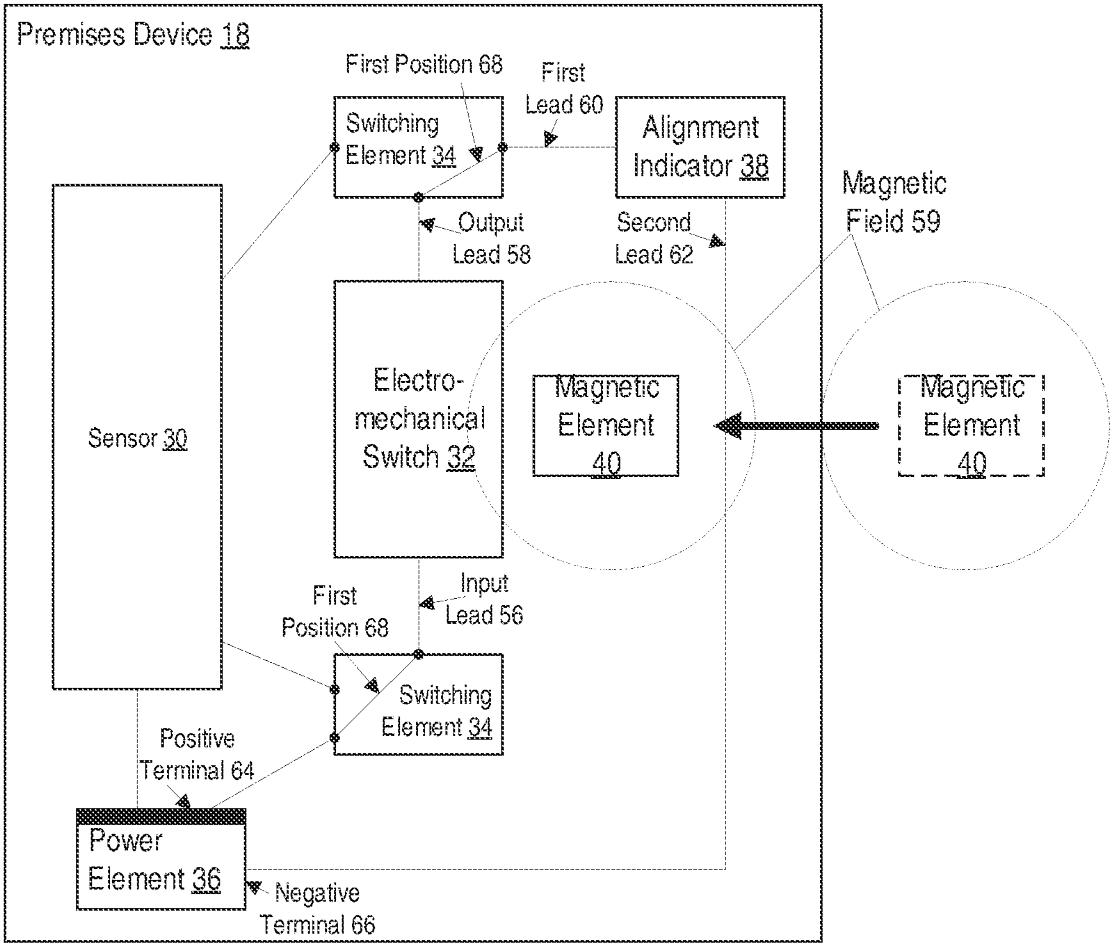
FIG. 3 is a block diagram of an example of a premises device in the system of FIG. 2 where the switching element is in a first position according to some embodiments of the present disclosure.

FIG. 3 is a block diagram of an example of a premises device 18 in the system of FIG. 2 where switching element 34 is in a first position according to some embodiments of the present disclosure. In particular, switching element 34 is in a first position 68 where switching element 34 is configured to electrically connect output lead 58 of electromechanical switch 32 with first lead 60 of alignment indicator 38, and to electrically connect input lead 56 to positive terminal 64 of power element 36. In one example, when switching element 34 is in the first position, electromechanical switch 32 may enter a close position when within the coverage and/or range of magnetic field 59, thereby electrically connecting input lead 56 with output lead 58. In this example, current, power and/or voltage are provided to alignment indicator 38 when electromechanical switch 32 is in the close position, thereby causing alignment indicator 38 to generate feedback (e.g., visual, haptic and/or audible feedback) indicating that electromechanical switch 32 is within magnetic field 59 of magnetic element 40 (i.e., when electromechanical switch 32 and magnetic element 40 are magnetically alignment).

Continuing this example of the first position of switching element 34, when electromechanical switch 32 is not within range of magnetic field 59 of magnetic element 40 (e.g., door or window is open), electromechanical switch 32 will be in an open position such that power, voltage and/or current will not be communicated to alignment indicator 38 (i.e., alignment indicator 38 is OFF).

Figure 4:
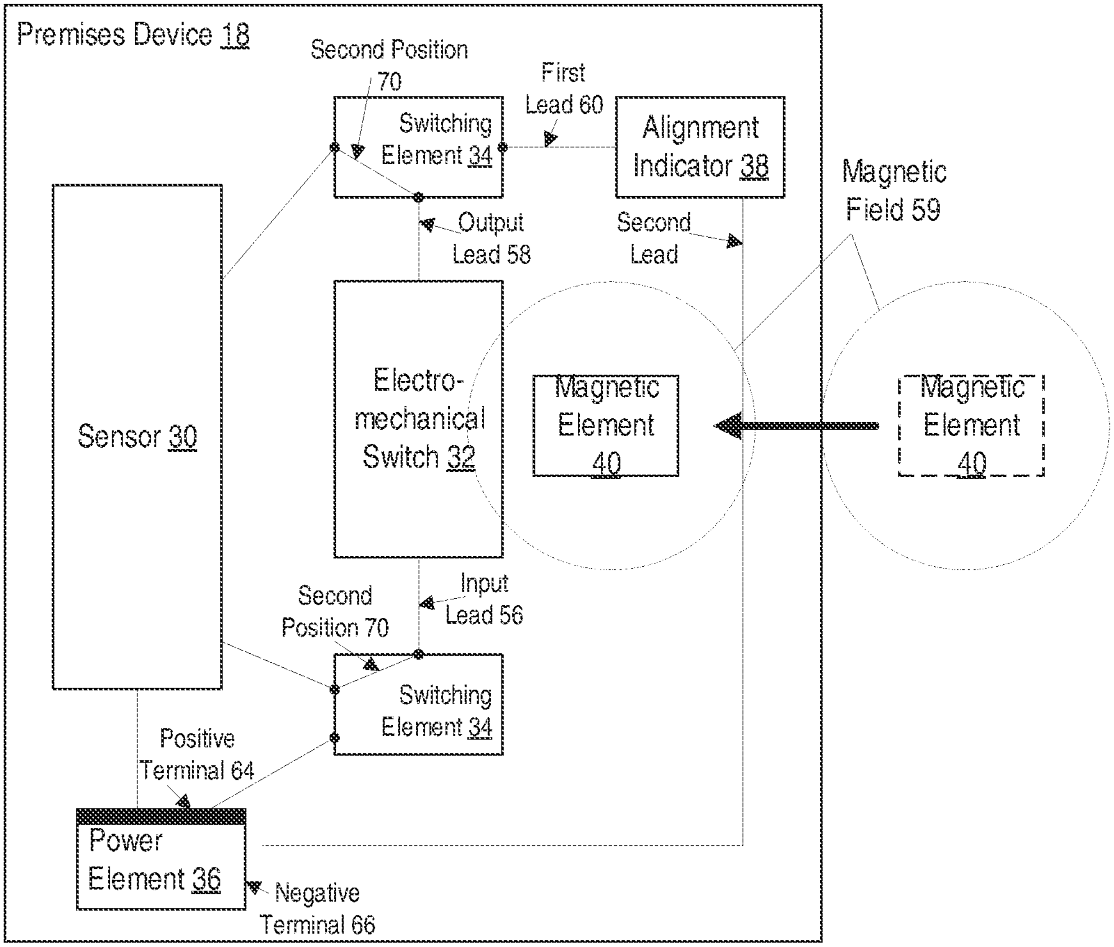
FIG. 4 is a block diagram of an example of a premises device in the system of FIG. 2 where the switching element is in a second position according to some embodiments of the present disclosure.

FIG. 4 is a block diagram of an example of a premises device 18 in the system of FIG. 2 where switching element 34 is in a second position according to some embodiments of the present disclosure. In particular, FIG. 4 shows switching element 34 in a second position 70 where switching element 34 is configured to electrically connect output lead 58 of electromechanical switch 32 with sensor 30, and to electrically connect input lead 56 of electromechanical switch 32 to sensor 30. In this example, power, voltage and/or current from power element 36 is communicated to electromechanical switch 32 via sensor 30 where sensor 30 is configured to sense whether electromechanical switch 32 is in an open or close position. Further, in this example, alignment indicator 38 is not in electrical communication with electromechanical switch 32 such that alignment indicator 38 does not generate feedback when electromechanical switch 32 is within range of magnetic field 59.

In one or more embodiments, switching element 34 is configured to switch alignment indicator 38 or sensor 30 into an electrical circuit or circuitry that includes electromechanical switch 32.

Figure 5:
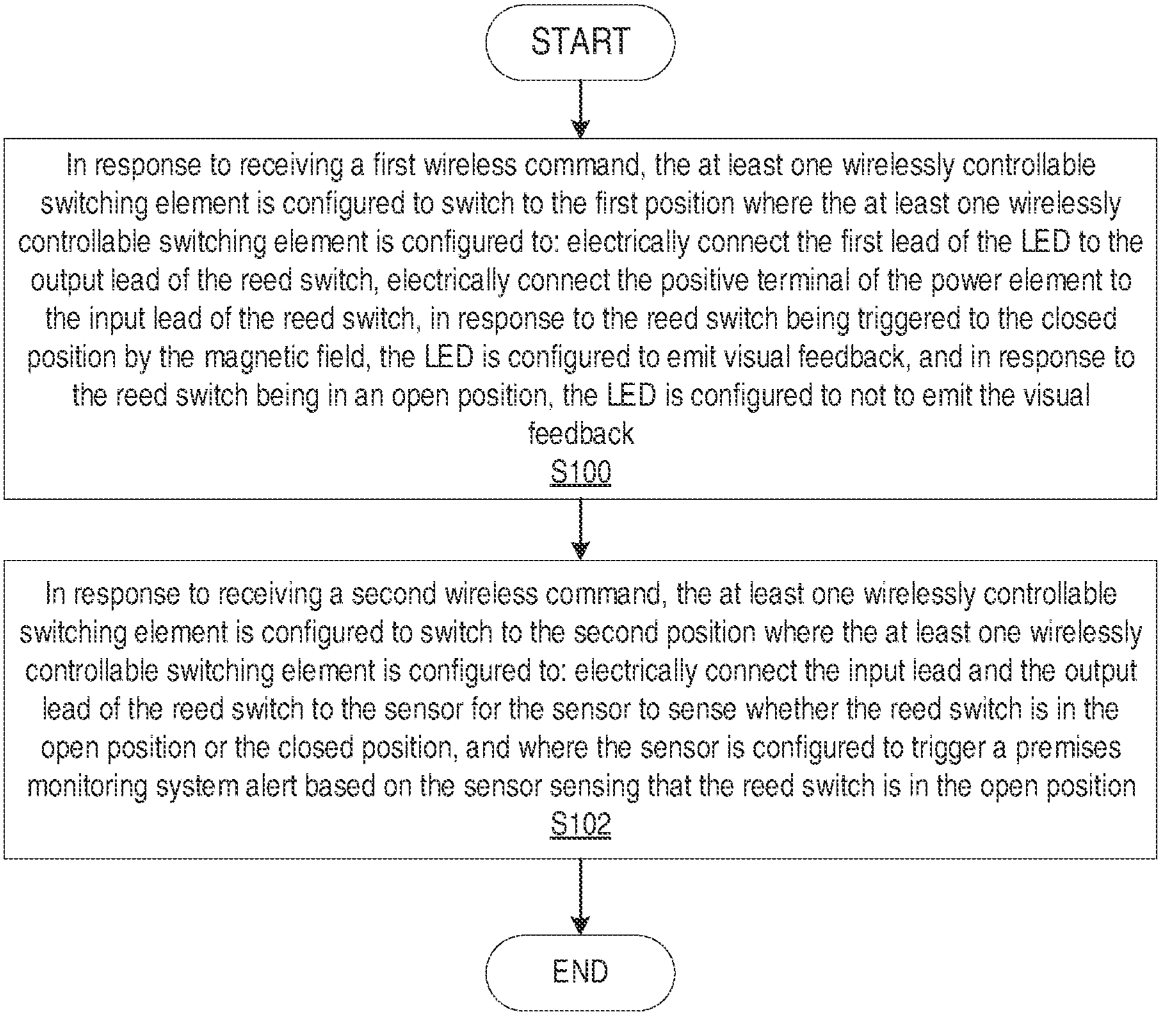
FIG. 5 is a flowchart of an example process according to some embodiments of the present disclosure.

FIG. 5 is a flowchart of an example process of premises device 18 according to some embodiments of the present disclosure. One or more blocks described herein may be performed by one or more elements of premises device 18, such as by one or more of sensor 30, electromechanical switch 32, switching element 34, etc.

According to one or more embodiments, premises device 18 comprises at least one wirelessly controllable switching element 34 that is switchable between a first position 68 and second position 70. Premise device 18 further comprises a reed switch (e.g., type of electromechanical switch 32) comprising an input lead 56 and an output lead 58 where the input lead 56 and the output lead 58 are in electrical communication with the at least one wirelessly controllable switching element 34, and the reed switch is triggerable to a closed position by a magnetic field 59. Premises device 18 further comprises a light emitting diode (LED) (e.g., type of alignment indicator) comprising a first lead 60 and a second lead 62 where the first lead 60 of the LED is in electrical communication with the at least one wirelessly controllable switching element 34, and the LED is configured to emit a visual indication to indicate the reed switch is aligned (e.g., magnetically aligned) for monitoring. Premises device 18 further comprises a sensor 30 in electrical communication with the at least one wirelessly controllable switching element 34, and a power element 36 comprising a positive terminal 64 and negative terminal 66 where the positive terminal 64 is in electrical communication with the sensor 30 and the at least one wirelessly controllable switching element 34. The negative terminal 66 is in electrical communication with the sensor 30 and the second lead 62 of the LED.

In response to receiving a first wireless command, the at least one wirelessly controllable switching element 34 is configured to switch to the first position 68 where the at least one wirelessly controllable switching element 34 is configured to electrically connect the first lead of the LED to the output lead 58 of the reed switch, and electrically connect the positive terminal 64 of the power element 36 to the input lead 56 of the reed switch (Block S100). In response to the reed switch being triggered to the closed position by the magnetic field 59, the LED is configured to emit visual feedback. In response to the reed switch being in an open position, the LED is configured to not to emit the visual feedback.

In response to receiving a second wireless command, the at least one wirelessly controllable switching element 34 is configured to switch to the second position 70 where the at least one wirelessly controllable switching element 34 is configured to electrically connect the input lead 56 and the output lead 58 of the reed switch to the sensor 30 for the sensor 30 to sense whether the reed switch is in the open position or the closed position. The sensor 30 is configured to trigger a premises monitoring system alert based on the sensor 30 sensing that the reed switch is in the open position.

According to one or more embodiments, the premises device 18 is a door sensor or window sensor, and where the premises device 18 further comprises a magnetic element 40 that is configured to emit the magnetic field 59 where the visual indication is associated with alignment between the reed switch and the magnetic element 40 when the reed switch is within range of the magnetic field 59.

According to one or more embodiments, the wireless command is triggered by: a remote monitoring environment 26, or a security control device 20 of the premises monitoring system 12 in response to enrollment of the premises device 18.

According to one or more embodiments, the at least one switching element 34 and the alignment indicator 38 are removably insertable into the premises device 18.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspect. Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object-oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A device, comprising:
- at least one switching element that is switchable to a first position;
- an electromechanical switch in electrical communication with the at least one switching element, the electromechanical switch being triggerable to a closed position by a magnetic field;
- an alignment indicator in electrical communication with the at least one switching element, the alignment indicator being configured to indicate the electromechanical switch is aligned based on an alignment of the electromechanical switch relative to the magnetic field; and
- in response to the at least one switching element being in the first position, the at least one switching element being configured to:
  - electrically connect the alignment indicator to the electromechanical switch; and
  - in response to the electromechanical switch being triggered to the closed position by the magnetic field, the alignment indicator being configured to emit at least one of visual, audio or haptic feedback based on the alignment of the electromechanical switch.

2. The device of claim 1, wherein in response to the at least one switching element being in the first position, the at least one switching element is further configured to electrically disconnect a sensor from the electromechanical switch.

3. The device of claim 1, further comprising a magnetic element that is configured to emit the magnetic field.

4. The device of claim 1, further comprising a sensor in electrical communication with the at least one switching element, the at least one switching element being further switchable to a second position; and
- in response to the at least one switching element being in the second position, the sensor being configured to:
  - sense that the electromechanical switch is in an open position; and
  - trigger an alert based on the sensor sensing that the electromechanical switch is in the open position.

5. The device of claim 1, further comprising a sensor in electrical communication with the at least one switching element, the at least one switching element being further switchable to a second position; and
- in response to the at least one switching element being in the second position, the at least one switching element being configured to:
  - electrically disconnect the alignment indicator from the electromechanical switch; and
  - electrically connect the sensor to the electromechanical switch for sensing whether the electromechanical switch is in an open position or the closed position.

6. The device of claim 5, wherein a position of the at least one switching element is configured to be set based on a wireless command.

7. The device of claim 1, wherein a position of the at least one switching element is configured to be set based on a wireless command.

8. The device of claim 7, wherein the wireless command is configured to cause the at least one switching element to move or remain in the first position.

9. The device of claim 7, wherein the device further comprises a communication interface configured to receive the wireless command from a device associated with a premises monitoring system.

10. The device of claim 1, wherein the electromechanical switch is a reed switch.

11. The device of claim 1, wherein the alignment indicator is a light emitting diode (LED).

12. The device of claim 1, wherein the at least one switching element and the alignment indicator are removably insertable into the device.

13. A method implemented by a device, the device comprising at least one switching element that is switchable to a first position, an electromechanical switch in electrical communication with the at least one switching element, the electromechanical switch being triggerable to a closed position by a magnetic field, an alignment indicator in electrical communication with the at least one switching element, the alignment indicator being configured to indicate the electromechanical switch is aligned based on an alignment of the electromechanical switch relative to the magnetic field, the method comprising:
- in response to the at least one switching element being in the first position, the at least one switching element being configured to:

electrically connecting the alignment indicator to the electromechanical switch; and in response to the electromechanical switch being triggered to the closed position by the magnetic field, emitting at least one of visual, audio or haptic feedback based on the alignment of the electromechanical switch.

14. The method of claim 13, further comprising, in response to the at least one switching element being in the first position, electrically disconnecting a sensor from the electromechanical switch.

15. The method of claim 13, wherein the device further comprises a magnetic element that is configured to emit the magnetic field.

16. The method of claim 13, wherein the device further comprises a sensor in electrical communication with the at least one switching element, the at least one switching element being further switchable to a second position; and the method further comprising:

in response to the at least one switching element being in the second position:

sensing that the electromechanical switch is in an open position; and triggering an alert based on the sensor sensing that the electromechanical switch is in the open position.

17. The method of claim 13, wherein the device further comprises a sensor in electrical communication with the at least one switching element, the at least one switching element being further switchable to a second position; and the method further comprising:

in response to the at least one switching element being in the second position:

electrically disconnecting the alignment indicator from the electromechanical switch; and electrically connecting the sensor to the electromechanical switch for sensing whether the electromechanical switch is in an open position or the closed position.

18. The method of claim 13, wherein a position of the at least one switching element is configured to be set based on a wireless command.

19. The method of claim 18, further comprising:

receiving the wireless command; and in response to the wireless command, causing the at least one wirelessly controllable switching element to move or remain in the first position.

20. The method of claim 13, wherein the electromechanical switch is a reed switch and the alignment indicator is a light emitting diode (LED).

* * * * *